United States Patent
Lazarus

(10) Patent No.: US 7,095,824 B2
(45) Date of Patent: Aug. 22, 2006

(54) INSTRUCTIVE OUT-OF-SERVICE TELEPHONE LINES

(75) Inventor: David Beryl Lazarus, Elkins Park, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 10/696,310

(22) Filed: Oct. 29, 2003

(65) Prior Publication Data

US 2005/0094789 A1   May 5, 2005

(51) Int. Cl.
*H04M 1/24*   (2006.01)
(52) U.S. Cl. ............... 379/32.01; 379/1.01; 379/1.03; 379/27.01; 379/29.01; 379/9.01; 379/15.01; 379/201.01; 379/201.02; 379/377; 379/381; 379/382; 379/384
(58) Field of Classification Search .......... 379/201.01, 379/201.12, 1.01, 1.03, 27.01, 29.01, 32.01, 379/9.01, 15.01, 377, 381, 382, 384
See application file for complete search history.

(56) References Cited

U.S. PATENT DOCUMENTS

| | | | |
|---|---|---|---|
| 4,473,719 A | * | 9/1984 | Embree et al. ............. 379/382 |
| 4,577,066 A | * | 3/1986 | Bimonte et al. ............ 379/243 |
| 5,535,264 A | * | 7/1996 | Starr et al. ............... 379/88.25 |
| 6,178,241 B1 | * | 1/2001 | Zhou .......................... 379/382 |
| 2002/0159577 A1 | * | 10/2002 | Vardie et al. | |
| 2005/0021798 A1 | | 1/2005 | Forte-McRobbie et al. . 709/229 |

OTHER PUBLICATIONS

Forte-McRobbie et al. VoIP hybrid DLC Jan. 27, 2005.*

* cited by examiner

*Primary Examiner*—Quynh H. Nguyen
(74) *Attorney, Agent, or Firm*—Benjamin D. Driscoll

(57) ABSTRACT

A method (10, 20) and apparatus (30) enables a customer (47) to distinguish between a dead or broken Internet Protocol telephone line and an out-of-service Internet Protocol telephone line. The method detects (11) a hook status of a device (46) coupled to the IP network (33) during an out-of-service status of the line. Upon detection of a change in state from an on-hook state to an off-hook state, a message is sent (13) to the device (46) indicating that the IP telephone line is currently out-of-service and not dead or broken. This message can be a voice or text message. Moreover, the message can provide status information for all of the interfaces of the device coupled to the IP telephone line. In addition, the message can include information as to how to obtain service, such as a telephone number to call.

14 Claims, 6 Drawing Sheets

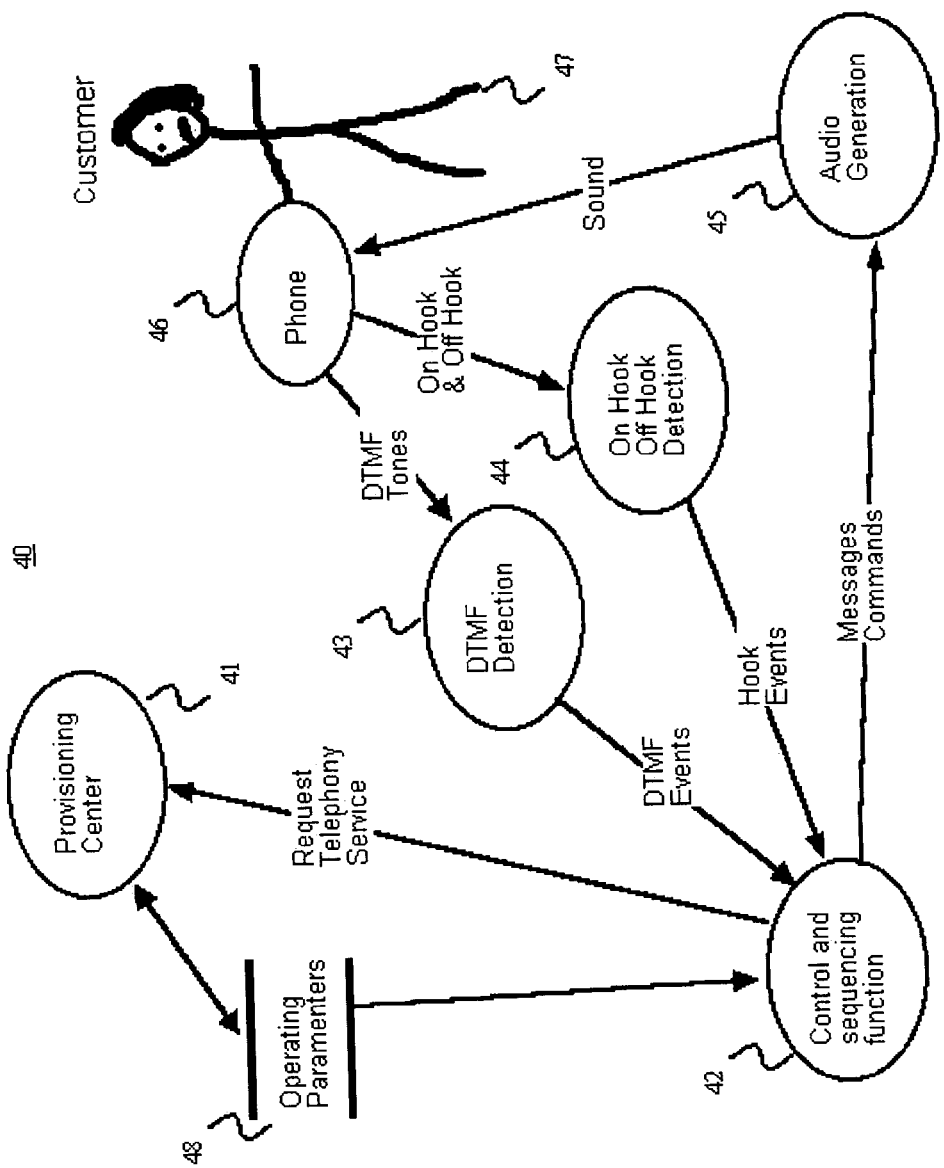
FIG 4 – System Data Flow Diagram

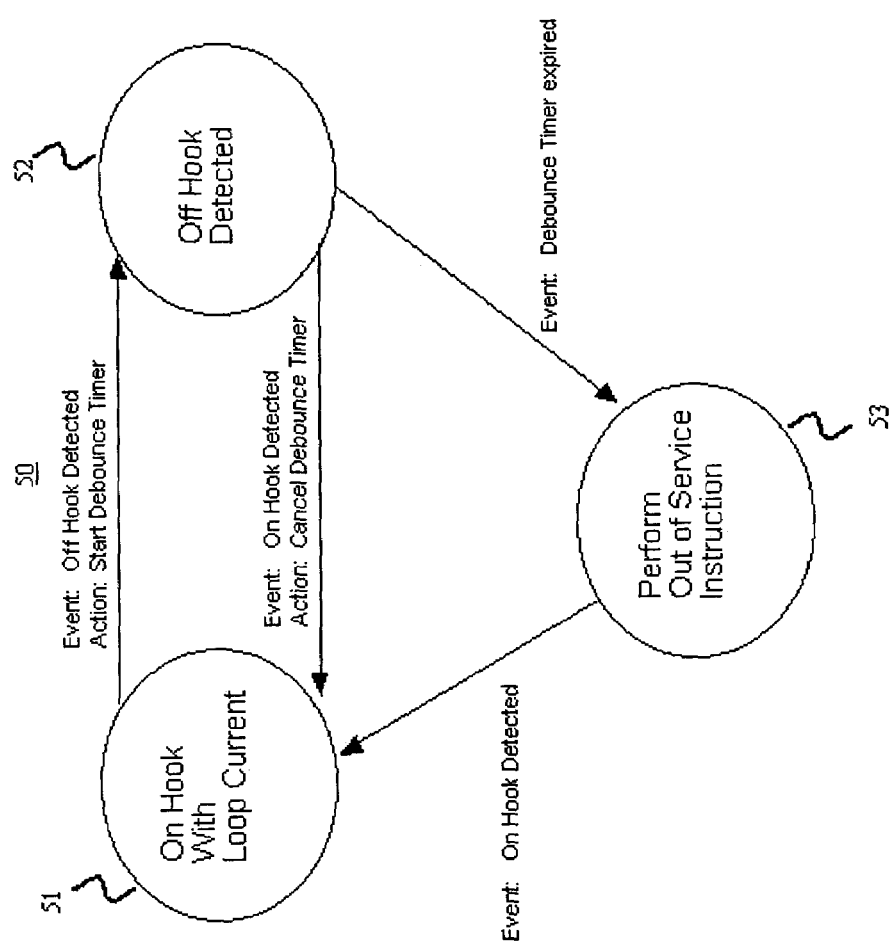
FIG 5 – Normal Hook Status Detection State Machine

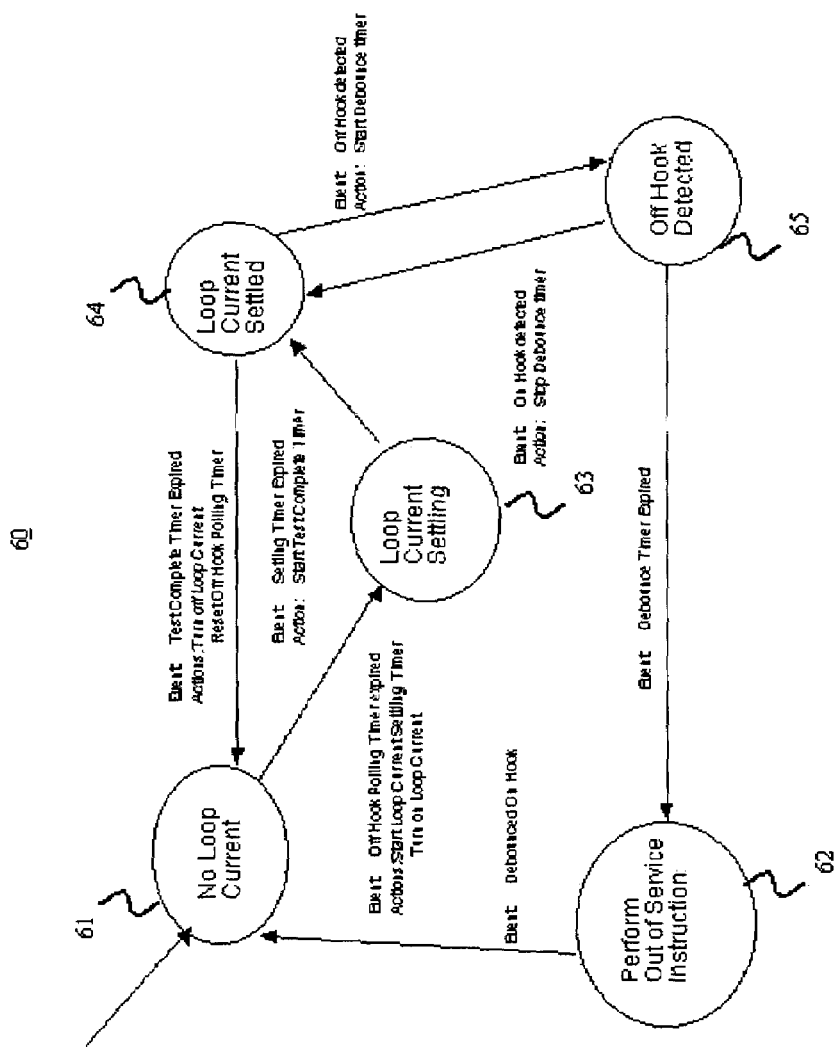
FIG 6 – Power Savings Hook Status Detection State Machine

INSTRUCTIVE OUT-OF-SERVICE TELEPHONE LINES

FIELD OF THE INVENTION

The present invention relates generally to method and apparatuses for telephony signaling, and more particularly to a method and apparatus for telephony signaling in IP based telephony.

BACKGROUND

In the conventional phone system, when a phone line is out-of-service, the phone line is completely dead. In other words, the phone line has no loop current and generates no sound. The same remains true if the telephone line is broken. Thus, the user of a telephone line has no ability to determine the difference between these two possibilities, and therefore must act to determine which one is the case. With the arrival of Internet Protocol (IP) Telephony, there is an opportunity to improve upon the Public Switched Telephone Network (PSTN) model.

Thus, the present invention is therefore directed to the problem of developing a method and apparatus for distinguishing between an out-of-service telephone line and a broken telephone line in Internet Protocol Telephony.

SUMMARY OF THE INVENTION

The present invention solves these and other problems by providing an out-of-service message to a potential customer when attempting to access an out-of-service IP telephony line using an IP Telephony device or other telephony device. Clearly, a broken IP telephone line will still be completely dead, so the above technique will provide a distinction between the two possibilities, thereby enabling the user to take appropriate action.

BRIEF DESCRIPTION OF THE DRAWINGS

FIG. 4 depicts a flow of information (data) in an exemplary embodiment of a system according to still another aspect of the present invention.

FIG. 5 depicts a state diagram of an exemplary embodiment of a system for detecting hook status according to yet another aspect of the present invention.

FIG. 6 depicts a state diagram of an exemplary embodiment of a power saving system for detecting hook status according to still another aspect of the present invention.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

When an IP Telephony phone line is out-of-service, the IP Telephone line is un-provisioned. Following the PSTN mode, un-provisioned telephony lines (ie., endpoints) are silent and have no loop current. This behavior also minimizes the use of electricity and system resources.

In accordance with one aspect of the present invention, there is now a distinction between a phone line being out-of-service and being un-provisioned. When a phone line is out-of-service, the phone line is now provisioned as "out-of-service," that is, the phone line now has a defined state of being out-of-service, which institutes certain responses as set forth herein. When the "out-of-service" phone coupled to the IP telephone line goes off-hook, a message is played to the telephone user informing the telephone user that service can be enabled and explaining how to add service to the out-of-service IP telephone line. This might occur, for example, if a customer has one line of service using a two-line product. If the customer plugs a telephone into the second "out-of-service" IP telephone line, a message similar to the following would be played:

THIS LINE IS CURRENTLY OUT-OF-SERVICE! YOU CAN TURN ON SERVICE TO THIS LINE BY DIALING "0" AND SPEAKING WITH A COMPANY REPRESENTATIVE

A similar message would be played if the customer has only one line or two or more lines. Any of the lines that are out-of-service will have this message played when the phone goes off-hook.

Figure 1:
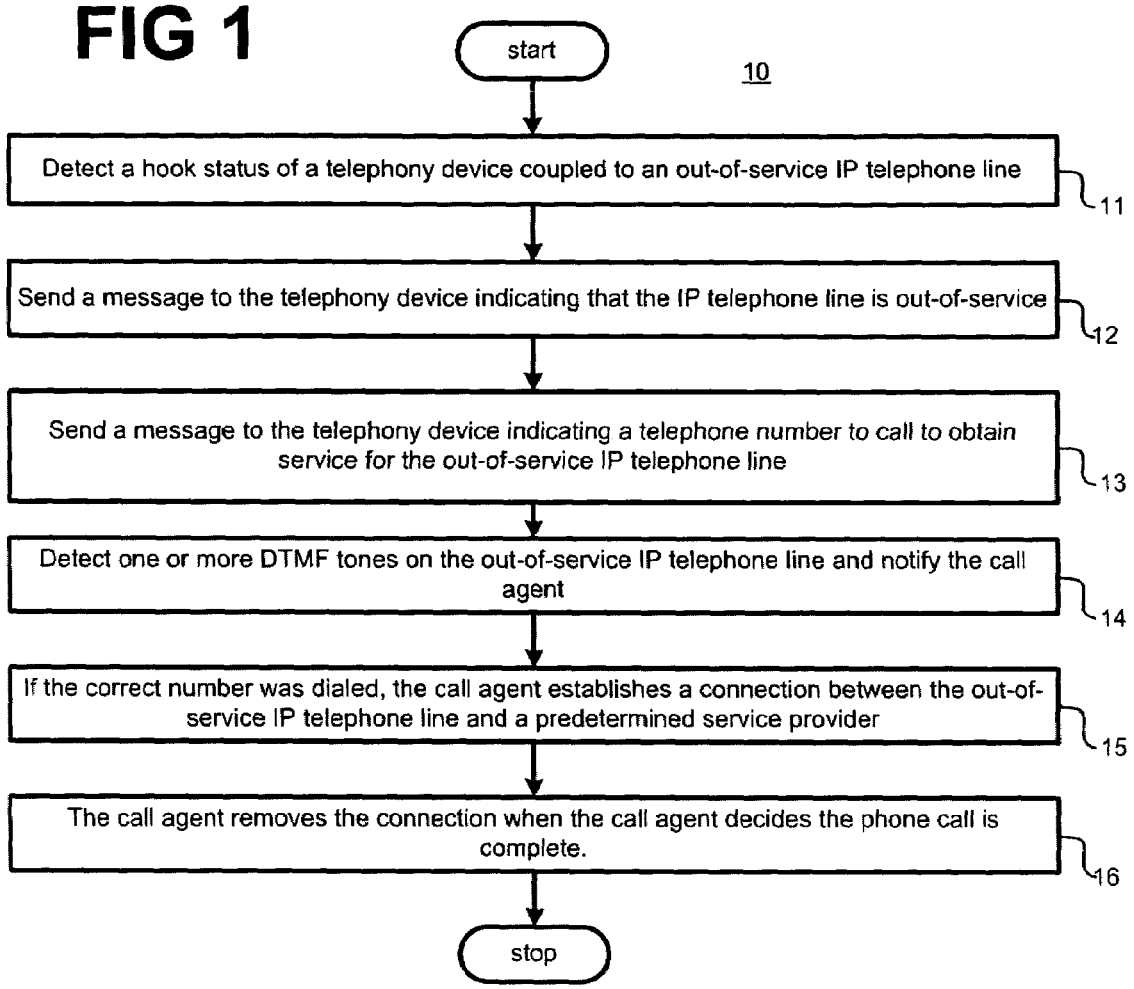
FIG. 1 depicts an exemplary embodiment of a method for differentiating between an out-of-service Internet Protocol telephone line and a broken line according to one aspect of the present invention.

FIG. 1 shows an exemplary embodiment of a method 10 for operating a telephony device coupled to an IP telephone line according to one aspect of the present invention. First, a hook status of the telephony device coupled to an out-of-service IP telephone line is detected (element 11). If the hook status is off-hook, a message is then sent to the telephony device indicating that the IP telephone line is out-of-service (element 12). The message may also indicate a telephone number to call to obtain service for the out-of-service IP telephone line (element 13). Upon detecting one or more DTMF tones on the out-of-service IP telephone line (element 14), if the correct number was dialed a call agent is signaled to establish a connection between the out-of-service IP telephone line and a predetermined service provider (element 15). A connection is then established between the out-of-service IP telephone line and the predetermined service provider. After completion of a call between the user and the predetermined service provider, the connection between the out-of-service IP telephone line and the predetermined service provider is removed when the call agent decides the call is complete (element 16).

Figure 2:
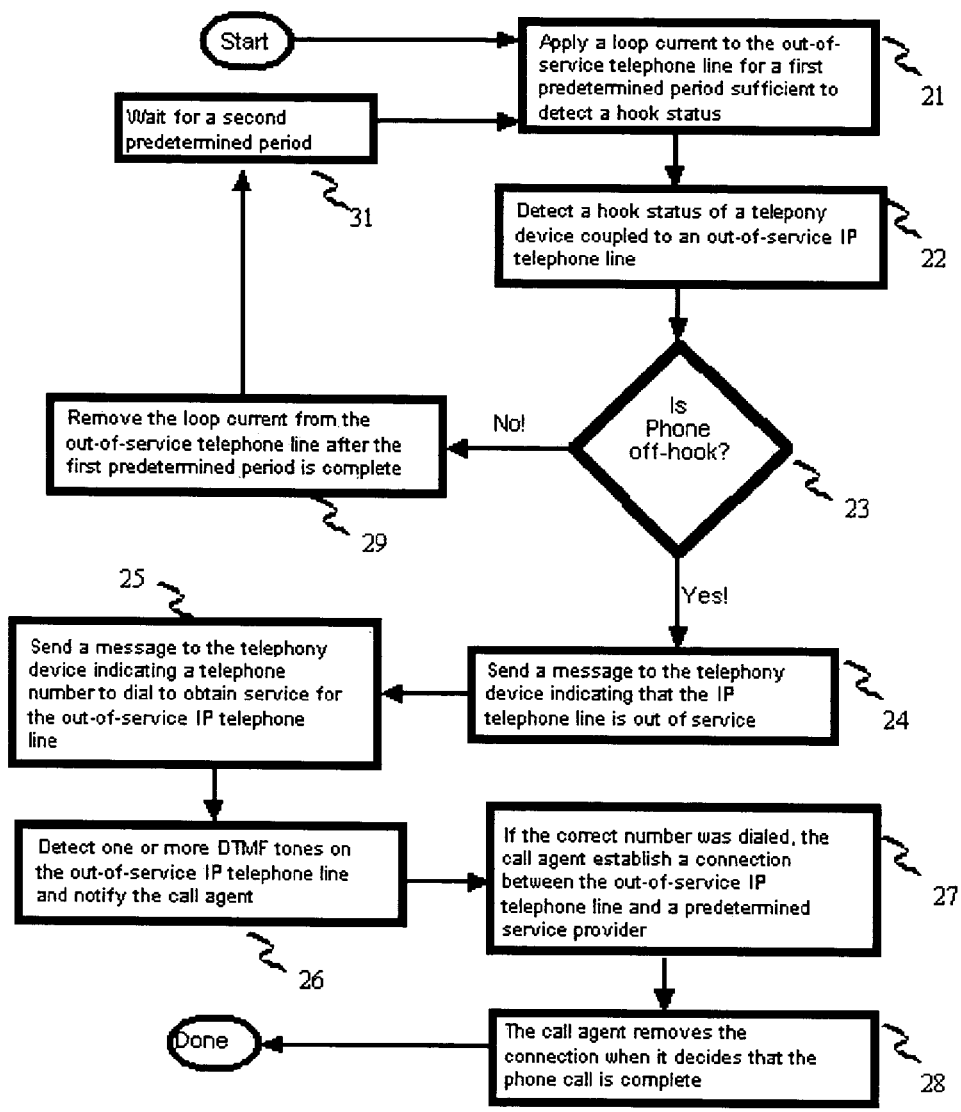
FIG. 2 depicts an exemplary embodiment of a method for differentiating between an out-of-service Internet Protocol telephone line and a broken line, which embodiment includes a power savings feature according to another aspect of the present invention.

Turning to FIG. 2, shown therein is another exemplary embodiment of a method 20 for operating an IP telephony system according to another aspect of the present invention. To detect hook status, a loop current is applied to the out-of-service telephone line for a first predetermined period sufficient to detect a hook status (e.g., about 50 milliseconds) (element 21). The hook status is then detected (element 22). The determination is then made as to whether the phone is off-hook or not (element 23). If the phone is off-hook, a message is sent to the telephony device indicating that the IP telephone line is out of service (element 24). A message is also sent to the telephony device indicating a telephone number to call to obtain service for the out of service IP telephone line (element 25). One or more DTMF tones may then detected on the out-of-service IP telephone line and the call agent is then notified upon such detection (element 26). If the correct number was dialed the call agent establishes a connection between the out-of-service IP telephone line and a predetermined service provider (element 27). The connection between the out-of-service IP telephone line and the predetermined service provider is removed when the call agent decides the call is complete (element 28).

Turning back to decision element 23, if the phone is not off-hook, the loop current is removed from the out-of-service telephone line after the first predetermined period is complete. (element 29). The system then waits for a second predetermined period and returns to initial element 21 (element 31).

The applying and removing of loop current to and from the out-of-service IP telephone line is periodically repeated. Generally, to save significant power, the second predetermined period should be longer than the first predetermined period, which in turn should be as short as possible. Of course, to detect hook status, a current must be applied, however, if power savings is not a concern, the steps of applying and removing power to the line can be skipped.

Figure 3:
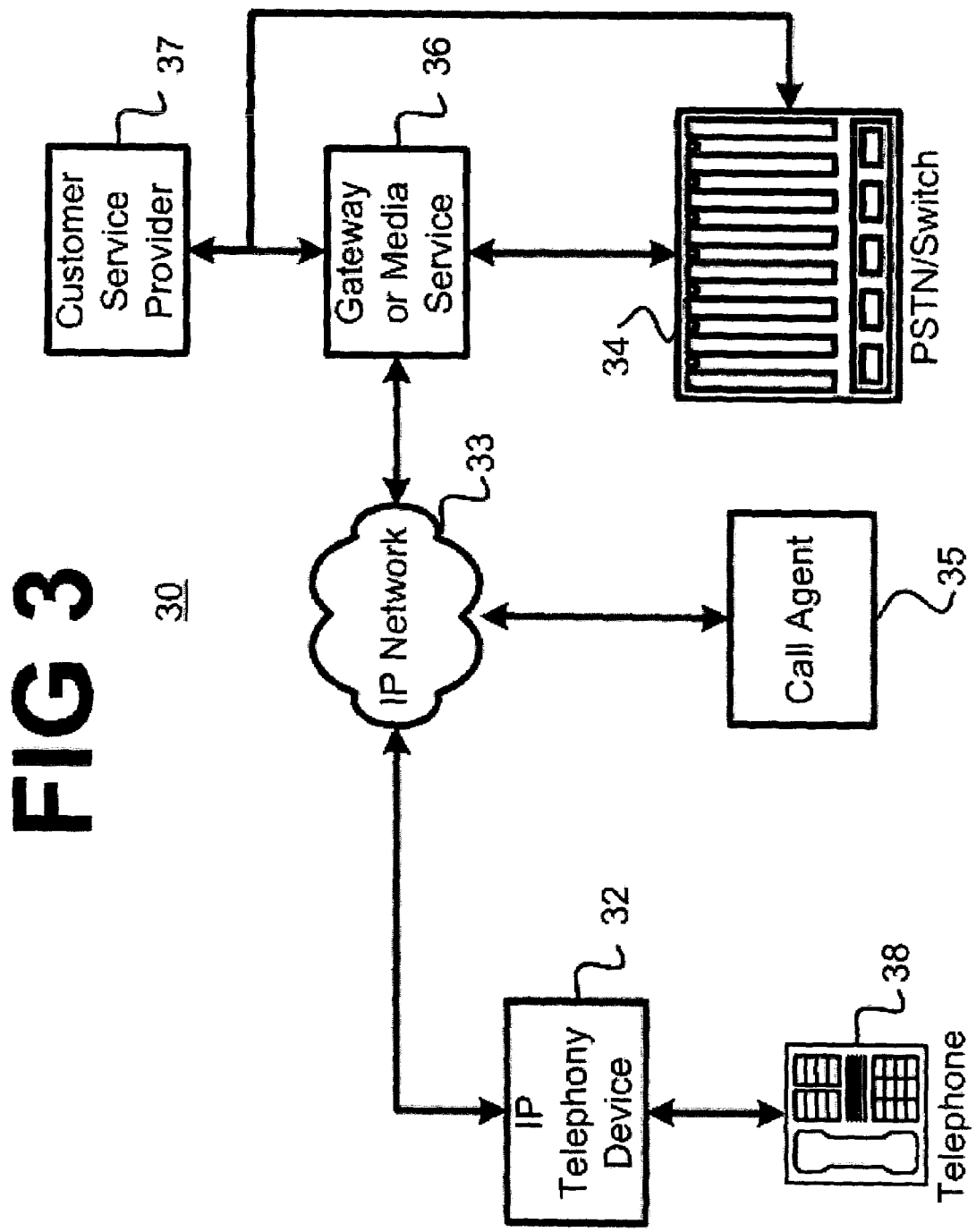
FIG. 3 depicts an exemplary embodiment of an IP telephony system according to yet another aspect of the present invention.

Turning to FIG. 3, shown therein is one exemplary embodiment of an apparatus 30 for implementing the above technique. An IP Telephony device 32, such as a Media Terminal Adapter (MTA), monitors the hook status of the "out-of-service" line or lines, in the case of multiple lines, to one of which telephone 38 is coupled. When the line or lines go off-hook, the system 30 delivers a correct out-of-service message. If the customer dials the customer representative 37, the Dual Tone Multiple Frequency (DTMF) detection is enabled and a call setup mechanism implemented by the call agent 35.

The generation of the message can be performed either by the MTA or by the MTA in conjunction with other components of the telephone system. If the MTA performs the message generation independently, then message is stored within the MTA. The MTA can either be: (1) manufactured with the message; (2) provided with the message via downloaded software; or (3) provisioned with the message. Within the MTA, there is a control function that monitors the line status and plays out the message. To save space, the message will most likely be compressed. The MTA normally includes a DSP function that contains a vocoder/wavecoder function that can be used to restore a compressed message. The MTA can also perform DTMF detection. When a digit or a set of digits is detected, the MTA can signal a call agent 35 via an IP network 33 to set-up a connection to the new service center of the service providers 37. The new service center may be connected either via a gateway or via the PSTN.

Alternately, most of the MTA functions can be performed by network components. For instance, when the line goes off-hook, a call agent 35 can be notified and the call agent 35 can set up a bi-directional connection to a gateway or media service 36 that is connected to PSTN/switch 34 and then can perform any or all of the following functions: (1) DTMF detection; (2) message generation; (3) message storage; and (4) vocoder/wavecoder expansion (e.g., synthesis).

FIG. 4 depicts a data flow diagram of a system 40 according to another aspect of the present invention. The functions labeled "DTMF Detection 43", "On-Hook Off-Hook Detection 44", "Audio Generation 45" and "Control and Sequencing Function 42" may be performed by the local MTA or by a headend component. These functions may be split between the MTA and the Headend, as well. For instance, the "control and sequence function 42" may be implemented splitting the function between both the MTA internals and the call agent hosted within the IP Network.

The function labeled "DTMF Detection 43" processes the signal generated by the customer's phone and detects the "Dual Tone Multi-Frequency" signal generated by the phone when any button on the keypad is pressed. The end of the key press is also detected. The North American specification of this operation is defined by various Bellcore specifications, such as Bellcore GR 506-CORE and by various ETSI specifications internationally. This function sends events to signal the change of status to the "Control and Sequencing Function 42".

The function labeled "On-Hook Off-Hook Detection 44" monitors the loop current to the customer's phone and detects hook status. On-Hook Off-Hook Detection 44 detects the phone 46 being picked up and put down by detecting a change in the loop current. The North American specification of this operation is defined by various Bellcore specifications, such as Bellcore GR 506-CORE and by various ETSI specifications internationally. This function sends events to signal the detection of a DTMF to the "Control and Sequencing Function 42".

The function "Audio Generation 45" generates the electrical signal on the phone line that will cause the phone to produce the sound necessary to deliver the specific message to the customer 47. The messages may be stored as PCM data, compressed audio data, or a sequence of phonemes or text to be feed into a text to speech generator. The North American specification of this operation is defined by various Bellcore specifications, such as Bellcore GR 506-CORE and by various ETSI specifications internationally. This function receives commands from the "Control and Sequencing Function 42" to generate tones and play out messages to be heard by the customer.

The function labeled "Control and Sequencing Function 42" coordinates the interactions of the other components. Typically, an out-of-service phone line will be on-hook (or no phone will be connected). When a phone connected to the out-of-service phone line goes off-hook, the "Control and Sequencing Function 42" receives notification from the "On-Hook Off-Hook Detection 44" function. The "Control and Sequencing Function 42" will direct the "Audio Generation 45" function to generate a message for the customer. This message will present the status of the line and explain how to purchase phone service for the out-of-service line. Typically, this message will direct the customer to press a button on the telephone. Pressing this button will cause the phone to generate a DTMF tone. This tone will be detected by the "DTMF Detection 43" function. The "DTMF Detection 43" will notify the "Control and Sequencing Function 42". In turn, the "Control and Sequencing Function 42" notifies the Provisioning Center 41 so that the process of signing up the customer can begin.

The function labeled "Provisioning Center 41" performs two roles. First, the Provisioning Center 41 handles the requests for new telephony service. Most likely, the call agent 35 will create a connection between the customer phone 46 and the Provisioning Center 41. The customer can talk with a customer service representative who can collect the billing information. Optionally, the Provisioning Center 41 may configure the MTA operational parameters 48. These parameters 48 include the length of the timers, as well as other useful parameters.

Power Saving Features

With the present invention, the primary need for loop current is to detect an off-hook (e.g., hang down) event. The detection of off-hook does not require constant loop current. An out-of-service line can try periodic tests for off-hook events. When an off-hook event is detected, the loop current should be applied constantly or until some long timeout has expired or the phone is back on-hook.

While the line is on-hook, the MTA should conduct a period test for off-hook status. The first step in this test is to apply loop current just long enough to reliably detect hook status. This test should be about 50 milliseconds, but may vary depending upon the specific hardware components used in the telephony device. When the test is complete, the loop current can be turned off, except if an off-hook status is detected. The test could repeat every second or so.

This technique provides a slow response, but should also be sufficient to detect a hook status change. On a normal PSTN line, the delay from going off-hook to hearing a dial tone should be less than 300 milliseconds. If a potential customer is checking if a phone line is working and they plug in a phone, the potential customer is likely to wait at least a second before deciding that the line is dead. If the line is powered 50 milliseconds once every second, there will be a 95% power savings.

Loop current is often used to power telephony devices, such as phones with lighted dials. Providing periodic loop current, as discussed above, will not support such devices, however, there is currently no expectation of loop current on an out-of-service line. Therefore, this should not be an issue.

Providing loop current to an out-of-service line can be a significant waste of electricity. FIG. 5 depicts a state machine diagram 50 of a hook status detection circuit according to one aspect of the present invention. Without power savings, there are three general states. Normally, the phone will be on-hook 51 and there will be sufficient loop current to detect hook status. In FIG. 5, when the phone is taken off-hook it enters the off hook detected state 52, where that status is debounced to eliminate false off-hook detection. In this diagram, the expiration of the Debounce Timer is the clear indication of off-hook status and results in a change of state to Perform Out of Service Instruction. If the off-hook status is spurious, the on-hook is detected shortly after the off-hook detection because it is still in the off-hook detected state 52. The Debounce Timer is canceled and the system 50 returns to the On-Hook With Loop Current state 51. Using the Debounce Timer, spurious off-hook events are eliminated because the off-hook must be consistently true for this period of time.

Once the phone is clearly off-hook, the "Out-of-service Instruction 53" begins. As described elsewhere, DTMF detection is turned on and the appropriate voice message is played out. This interaction is too complex to be described in this context; therefore it is collapsed into a single state 53. If the phone is hung up at any time during the "Out-of-service Instruction", the entire process is reset. The on-hook detected event could also be debounced, but it is not likely to be useful.

The debouncing may or may not be necessary depending on the specific hardware and software selected. It is a process that is usually necessary for handling glitches and spurious events on the line. The mechanical switch in the phone, the imperfect performance of the ring generation circuit, or the switching of the voltage between on-hook and off-hook conditions usually causes these glitches. Since the phone line is out-of-service, one can eliminate the ringing as a cause. Without debouncing, these glitches may result in unnecessary activities that may or may not impact the rest of the system. Without debouncing, the Off-Hook Detected state 52 and the Debounce Timer are removed. The Off-Hook event simply transitions to the Perform Out-of-service Instruction state 53.

Where the power saving option is not used, the Loop Current is applied the entire time. This is a huge waste of electricity for very little value. To save electricity, the Loop Current can be turned off while the phone is on-hook. About once a second, the loop current is turned on just long enough to conduct a test of hook status. This test can assume that ringing will not occur, since the phone line is out-of-service. Generally, hook status is complicated by the possibility of ringing, because ringing can cause false hook status readings. Without this complication, the time it takes to detect hook status should be significantly shortened, thus saving additional power.

According to another aspect of the present invention, shown in FIG. 6 is a state diagram of a system for saving power. Turning to FIG. 6, in the state labeled "No Loop Current 61" the line is completely dead. No current flows on the line and no power is wasted. An Off-Hook Polling Timer is active and expires every second or so. When it expires, the loop current is turned on and the Loop Current Settling Timer is started. Then the system 60 enters the state labeled "Loop Current Settling 63". When the Loop Current Settling Timer expires, the loop current should be even enough to distinguish between off-hook and on-hook reliably. Depending on the hardware and software selected, the settling time should be under 50 milliseconds. This translates to a savings in power of greater than 95%. The embodiment then enters the state labeled "Loop Current Settled 64" and the Test Complete Timer is started. If the Test Complete Timer expires before an off-hook condition is detected, the system 60 goes back to the state labeled "No Loop Current 61" and starts the process over by resetting the off-hook Polling Timer and turning off the loop current. If off-hook is detected in the "Loop Current Settled" state 64, the Debounce Timer is started and the system 60 goes to the "Off-hook Detected" state 65. While in the "Off-hook Detected state 65, if an on-hook is detected, the debounce timer is stopped and the embodiment goes to the "Loop Current Settled" state 64.

If the Debounce Timer expires while in the "Off-hook Detected" state 65, the system enters the "Perform Out-of-service Instruction" state 62. Once the phone is clearly off-hook, the "Out-of-service Instruction" begins. As described elsewhere, DTMF detection is turned on and the appropriate voice message is played out. If the phone is hung up at any time during the "Out-of-service Instruction", the entire process is reset. If at any time in the instruction, if the phone goes on-hook, the instruction ends, the system turns off the loop current and enters the "No Loop Current" state 61.

Another consideration is that the phone may inadvertently be off-hook. After some period of time, say an hour, if a phone is still off-hook, the system 60 should ignore the off-hook status, but continue to poll. Going back on-hook should reset the process.

MTA Service Status Reporting Function

Optionally, the "out-of-service" message could also report the status of the MTA's other interfaces. For example, the message could report that the other line is in service. This way the customer who has service on only some of the phone lines will be able to easily figure out which line should be working.

Advantages

By reducing the barrier to adding additional lines of service, the service provider will be rewarded with increased profits. The increased profits will make the service provider more willing to pay a higher price for each MTA with this feature. The barker message can reduce advertising costs by reminding the customer that the service is available at a time when the customer is most likely to be interested in this information. For potential customers undecided as to whether to add additional service, the additional effort of finding out how to add the service will prevent some customers from adding the service. By making the service addition trivial, more customers will make the spontaneous purchase decision. Moreover, support costs will be reduced because fewer customers will be confused by the presence of an out-of-service line where the MTA has multiple RJ-11 sockets.

Although various embodiments are specifically illustrated and described herein, it will be appreciated that modifications and variations of the invention are covered by the above teachings and are within the purview of the appended claims without departing from the spirit and intended scope of the invention. For example, certain messages are discussed for indicating the out-of-service state, however, others could be employed. Furthermore, this example should not be interpreted to limit the modifications and variations of the invention covered by the claims but is merely illustrative of one possible variation.

What is claimed is:

1. A method for operating a telephony device comprising:
   detecting a hook status of the telephony device coupled to an out-of-service Internet Protocol telephone line by:
   applying a loop current to the out-of-service telephone line for a first predetermined period sufficient to detect a hook status; and
   removing the loop current from the out-of-service telephone line after the first predetermined period for a second predetermined period, which is significantly longer than the first predetermined period;
   sending a message to the telephony device indicating that the Internet Protocol telephone line is out-of-service; and
   detecting one or more Dual Tone Multiple Frequency tones on the out-of-service Internet Protocol telephone line.

2. The method according to claim 1, wherein the message includes a voice message.

3. The method according to claim 1, wherein the message includes a text message.

4. The method according to claim 1, further comprising:
   sending a message indicating a telephone number to call to obtain service for the out-of-service Internet Protocol telephone line.

5. The method according to claim 1, further comprising:
   signaling a call agent to establish a connection between the out-of-service Internet Protocol telephone line and a predetermined service provider.

6. The method according to claim 5, further comprising:
   establishing a connection between the out-of-service Internet Protocol telephone line and the predetermined service provider.

7. The method according to claim 6, further comprising:
   removing the connection between the out-of-service Internet Protocol telephone line and the predetermined service provider after completion of a call between the user and the predetermined service provider.

8. The method according to claim 1, wherein the predetermined interval comprises about 50 milliseconds every one-second interval.

9. The method according to claim 1, further comprising: continuously repeating the applying and removing.

10. The method according to claim 1, further comprising sending a message indicating a status of one or more telephone lines.

11. An apparatus comprising:
    an Internet Protocol interface coupled to an Internet Protocol telephone line, which is provisioned as out-of-service;
    a telephone port to couple to a telephony device; and
    a processor detecting a hook status of the telephony device coupled to the telephone port by applying a loop current to the out-of-service telephone line for a first predetermined period sufficient to detect a hook status and removing the loop current from the out-of-service telephone line after the first predetermined period for a second predetermined period, which is significantly longer than the first predetermined period, generating a message to be output to the telephony device indicating that the Internet Protocol telephone line is out-of-service, and detecting one or more Dual Tone Multiple Frequency tones to be output over the out-of-service Internet Protocol telephone line.

12. The apparatus according to claim 11, wherein the processor sends a message indicating a telephone number to call to obtain service for the out-of-service Internet Protocol telephone line.

13. The apparatus according to claim 11, wherein the processor signals a call agent to establish a connection between the out-of-service Internet Protocol telephone line and a predetermined service provider.

14. A communications apparatus comprising:
    a loop current controller controlling a loop current on a telecommunications line;
    a hook status detector detecting a hook status of a telephone device coupled to the telecommunicattons line;
    a loop current settling timer initiated upon application of loop current by the loop current controller to the telecommunications line, and upon expiration of the loop current settling timer said hook status detector initiating a hook status test;
    a hook status test timer initiated upon initiation of a hook stains test by the hook status detector, and upon expiration of the hook status test timer said loop current controller removing the loop current from the telecommunications line;
    an off-hook polling timer initiated upon removal of the loop current from the telecommunications line by the loop current controller, and upon expiration of the off-hook polling timer said loop current controller applying the loop current to the telecommunications line; and
    a debounce timer initiated upon detection of an off-hook status by the hook status detector, upon expiration initiating an out-of-service instruction to be played to the telephone device over the telecommunications line after which the loop current controller removing loop current from the telecommunications line and initiating the off-hook polling timer, and said debounce timer being stopped upon detection of an on-hook status by the hook status detector.

* * * * *